United States Patent [19]
Hannes et al.

[11] 3,880,021
[45] Apr. 29, 1975

[54] METHOD OF MAKING A CAST ARTICULATED TOOL

[75] Inventors: Karl Hannes, White Plains; Paul C. Rossi, Franklin Square, both of N.Y.

[73] Assignee: Coats & Clark, Inc., New York, N.Y.

[22] Filed: Jan. 17, 1974

[21] Appl. No.: 434,106

[52] U.S. Cl. ............... 76/104 A; 76/101 R; 164/90; 29/527.5; 30/254; 30/346; 81/416
[51] Int. Cl. ............................................. B21k 11/06
[58] Field of Search .......... 76/104 A, 104 R, 101 R; 164/90, 94, 98, 111; 29/527.5, DIG. 8; 81/416

[56] References Cited
UNITED STATES PATENTS

| | | | |
|---|---|---|---|
| 488,590 | 12/1892 | Warner | 164/90 |
| 505,217 | 9/1893 | Eisele | 164/90 |
| 1,518,251 | 12/1924 | Carlson | 81/416 |
| 3,374,694 | 3/1968 | Eizenberg | 76/104 A |
| 3,600,979 | 8/1971 | Rozmus | 76/104 R |

*Primary Examiner*—Leonidas Vlachos

[57] ABSTRACT

An articulated cutting tool, such as scissors, is formed by casting a first element with a pivot region, and casting a second element using the pivot region of the first element as the mold for the pivot region of the second element. The pivot regions of the elements are tapered, and in order to free the pivot joint, the pin is upset, for example by punching in the axial direction of the pin. The articulated element thus formed is coated with a hard coating material, and the cutting edges of the tool are ground to provide a sharp cutting edge for shearing action to which the layer of hard coating material extends. The invention is also adaptable to articulated tools, such as pliers, which do not have cutting edges, in which case the plating and grinding of the tool may be omitted.

9 Claims, 13 Drawing Figures

- CAST FIRST & SECOND PARTS
- UPSET PIVOT & BEND BLADES
- DEBURR ASSEMBLY
- PLATE ASSEMBLY
- GRIND CUTTING EDGES

METHOD OF MAKING A CAST ARTICULATED TOOL

This invention relates to hinged articles, such as scissors pliers, forceps, nippers and the like, and is more particularly directed to such articles and the production of such articles wherein the hinged elements are sequentially cast and the first cast member is formed with a pivot that serves as a mold for the casting of the hinge portion of the other member. This casting technique is hereinafter referred to as "intercasting."

In one method of intercasting, such as disclosed in U.S. Pat. No. 2,577,350, L. H. Morin, for example, for the production of hinges and the like, one of the members of the article is first cast in a mold, this member being provided with a pivot pin or aperture during the casting process. The other member of the article is then cast in a mold, with the first member forming the part of the mold defining the joint of the article. In this process, it is thereby unnecessary to provide a separate hinge pin or screw for holding the members together and forming the pivot thereof, and the process constitutes a relatively inexpensive technique for forming an articulated product.

While the above described process has been successfully employed in the production of many useful articles, such as hinges, its adaptation to the production of cutting and holding tools, such as scissors and pliers, has been limited for several reasons. Thus, while for a number of years novelty items in the form of scissors and pliers have been produced by this technique, they have been more in the nature of toy or novelty items, since their operating characteristics were not satisfactory for normal use of such items. For example, due to the particular process as above described employed in the formation of the joint itself, there tended to be binding between the articles, so that the normal free action expected in tools of this type was not provided. Further, particularly with respect to cutting tools such as scissors, the cutting edges were not satisfactory for any practical cutting operations. One reason for the impracticality of such scissors resides in the fact that the metals from which the articles must be molded does not enable the provision of a sharp long lasting cutting edge. Thus, articulated tools formed by the above casting process were not considered to be generally practical or useful tools.

In some fields of use, for example in medical operations, it is necessary to employ reliable articulated cutting instruments such as shears, that will maintain their cutting edges without question throughout their desired period of use, and that have the necessary freedom of action without binding to insure accurate control of the tool. Sch tools are relatively expensive. It has been found that, for example in hospitals where stocks of high quality scissors must be maintained, it is difficult to keep track of such items, and that they must be continually replaced, possibly due to the attraction that such articles have for the personnel employing them or the personnel to whom they are available. While each such tool of course is not overly expensive from the standpoint of the operation of the hospital itself, the need for constantly replacing the items presents a constant budgetary problem for the institution. Up to now, a satisfactory inexpensive articulated cutting tool of sufficient quality and reliablity for use in hospitals has not been available.

It is therefore the object of this invention to provide an inexpensive articulated cutting or holding tool, as well as an apparatus for producing such a tool, in order to overcome the above discussed disadvantages of prior cutting and holding tools.

In accordance with one aspect of the invention, an articulated tool, for example a cutting tool such as scissors, is formed by intercasting the separate scissor elements. The pivot of the scissor elements is cast with a tapered shape. In order to provide freedom of movement between the elements, the pivot of the scissors is upset, for example by punching, thereby providing a small spacing between the elements to enable free relative movement. The elements, at least in the regions of their cutting blades, are plated with a hard material, such as nickel or chromium. In order to ensure a sharp cutting edge for the scissors, the cutting edges are ground in the conventional manner. While this grinding may remove all of the hard coating material in one region of the scissor blades, the hard coating material does extend to that region so that the hard coating material is present in the regions of the scissors where the shearing action actually occurs.

The scissors thus made are inexpensive to produce, provide the desirable freedom of movement at the pivot joints, and are reliable. In view of the minimum expense involved in the production of the scissors, they may be considered as expendable items.

The method of the invention is also adaptable to other articulated cutting tools, as well as to articulated non-cutting tools such as pliers and the like, in which case the plating and grinding steps may if desired be omitted.

In accordance with a further aspect of the invention, an articulated tool is provided in which the pivot pin for the articulated elements is integrally formed with one of the elements, the pivot pin being tapered and having an enlarged head to hold the second element at the pivot joint. The pin may have a groove extending therein from the head, the groove preferably being circular, to facilitate upsetting of the pivot pin for providing freedom of relative movement of the articulated elements.

If the articulated tool is a cutting tool, such as scissors, the tool is formed of a soft material, such as a casting material, and provided with a hard outer coating of a material such as nickel or chromium. The cutting edge of the tool is ground to a sharp edge, with the hard coating material extending to the cutting edge itself but the casting material extending to the ground face.

In articulated cutting tools such as scissors, it is conventional that the cutting blades be slightly bent in order to ensure proper shearing action between the blades. In accordance with a further aspect of the invention, a tool is provided for facilitating the bending of a blade of a pair of scissors. The tool is comprised of an anvil having a channel therein for receiving one element of the scissors, whereby the other articulated element of the scissors may rest on the tops of the sides of the channel. The tool further comprises a punch for punching the pivot of the scissors to upset the pivot joint, thereby providing freedom of movement at the pivot joint. The tool is especially adaptable for the freeing of the pivot joint of intercast scissors having tapered pivot regions in accordance with the invention.

In order that the invention will be more clearly understood, it will now be described in greater detail with reference to the accompanying drawings, in which.

Figure 1:
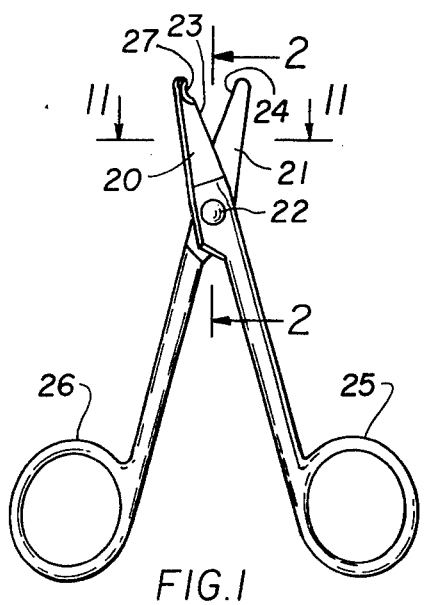
FIG. 1 is a plan view of a pair of scissors, which may be formed in accordance with the present invention.

Referring now to the drawings, and more in particular to FIG. 1, therein is illustrated a typical pair of scissors, which may be employed, for example, as a surgical instrument. It will be understood of course, that the present invention is not limited to the provision of scissors for this particular use, nor is it limited to cutting tools, since it is also applicable to other articulated tools such as pliers and forceps and the like. The scissors of FIG. 1 have the general conventional configuration with a pair of blades 20 and 21 hinged together at a pivot 22. The blades 20 and 21 have cooperating cutting edges 23 and 24 respectively on one end, and looped handles 25 and 26 respectively on the other ends thereof with respect to the pivot 22. For some purposes, such as for cutting threads, sutures, or the like, one of the blades may be provided with a notch 27 near the end of the respective cutting edge, in conventional fashion.

While the scissors of FIG. 1 may be formed by a number of different processes, the present invention is directed to the formation of the article by the intercast process. In this process, as described and disclosed, for example, in U.S. Pat. No. 2,577,350, one of the scissor blades is first cast, for example, with a pivot pin being molded integrally therewith. When the second scissor blade is subsequently cast, the pivot pin of the first cast blade forms part of the mold thereof, whereby the articulated joint is formed during the casting process and not by the later insertion of a pivot member such as a pin or screw or the like.

Figure 2:
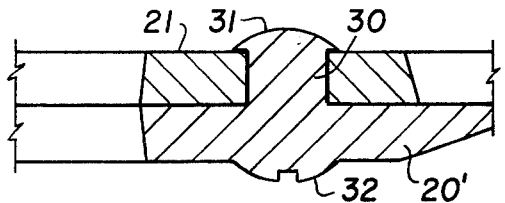
FIG. 2 is a cross sectional view of the pivot region of a pair of scissors, illustrating a prior art intercasting technique.

In the above paragraphs it was noted that scissors have been produced in the past employing the intercast technique. The form of the articulated joint of such known devices is illustrated in FIG. 2. This illustration is a cross sectional view taken along the lines 2—2 of the scissors of FIG. 1, when such scissors have been formed by prior art intercast techniques. As illustrated in FIG. 2, one of the scissor blades 20 has integrally cast therewith a pivot pin 30 extending normal to the axis of the blade. The pin 30 is provided with an enlarged head 31 which extends radially beyond the central portion of the pin. The other blade member 21 is cast with the pin 30 forming a part of the mold, thereby forming the articulated joint between the members without the necessity of providing a separate pivot pin or screw, the enlarged head 31 of the pin 30 insuring that the blade elements do not become separated. A simulated screw head 32 has generally been provided on the other side of the blade 21 aligned with the pin 30 for the sake of appearance, since it is normally expected that scissors should have some constructive feature at this point. It is to be further noted that in the scissors of FIG. 2, the pin 30 has an equal diameter throughout its length.

A pair of scissors formed in accordance with FIG. 2 is generally subject to binding and uneven operation. This may be a result of the fact that the pivot 30 cannot be perfectly formed to provide a perfectly circular pin with very smooth surfaces, whereby any non-uniformities in its shape or in its surface will tend to create binding at the pivot joint. As a consequence, scissors provided with a joint such as illustrated in FIG. 2 tend to have a binding uneven action at least until the metal at the pivot has become worn by use.

Figure 3:
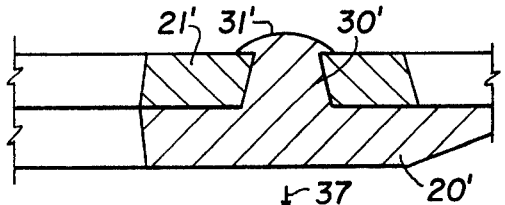
FIG. 3 is a cross sectional view of the pivot joint of an articulated tool in accordance with the invention.
Figure 4:
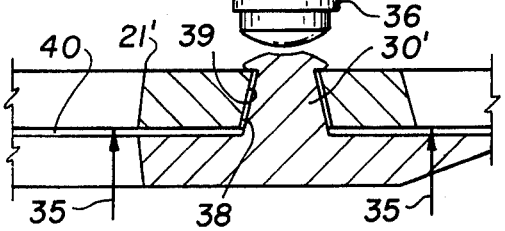
FIG. 4 is a cross sectional view corresponding to the view of FIG. 3 and illustrating a technique for upsetting the pivot joint.

According to the invention, in order to overcome this problem, as illustrated in FIG. 3, the scissors blade 20' is provided with a pin 30' cast integrally therewith that has a taper. The end of the central portion of the pin 30' away from the blade 20' is of smaller diameter than the end thereof toward the blade 20'. The pin 30' is also provided with an enlarged head 31', as in the arrangement of FIG. 2. The other blade member 21' is cast with the pin 30' forming a part of the mold, in a similar manner to that above described with respect to FIG. 2. Following the formation of the articulated joint as illustrated in FIG. 3, the pin 30' is upset to free the joint for smooth action. This operation, which will be discussed in greater detail in the following paragraphs, consists essentially of restraining the blade 21' from movement, for example by providing supports at the points indicated by the arrows 35 in FIG. 4, and then striking the end of the head 31' with a punch, for example, punch 36, in the direction indicated by the arrow 37. This operation effects the deformation of the pin 30' and its head 31', so that the blade 20' is forced downwardly slightly away from the blade 21', as illustrated in FIG. 4. As a result of this upsetting of the pin, it is to be noted that due to the provision of the taper on the pin 30', a small clearance 38 is provided between the pin 30' and the mating recess 39 of the blade 21'. A small clearance 40 also appears between the blades 20' and 21'.

The clearance around the pin and between the blades sufficiently free the articulated joint, so that free and steady movement between the scissor blades is obtained. For example, the clearance 40 may be about 0.001 inches.

The angle of the taper of the pin 30' is not particularly critical, although it should be great enough that only a small degree of upsetting of the pin is adequate to free the pivot joint while not being too great that the strength of the pin is weakened at one end. For example, it is preferred that the taper angle of the pin, with respect to its axis, be about 5°.

The scissors formed in accordance with the invention may be formed of any conventional casting material, such as for example, Beric, a zinc casting alloy. It is preferred that the casting material have more than 50 percent zinc, with the other constituents thereof being aluminum, copper and/or magnesium.

Figure 6:
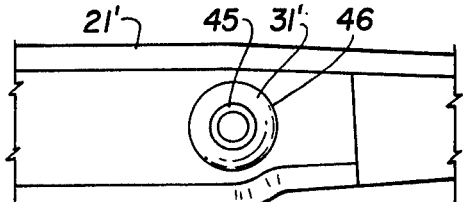
FIG. 6 is a top view of the pivot joint of an articulated tool in accordance with FIG. 5.
Figure 5:
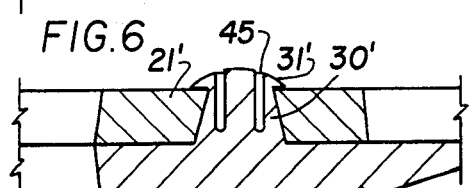
FIG. 5 is a cross sectional view of a modification of the pivot joint of FIG. 3.

A modification of the intercast joint of FIG. 3 is illustrated in FIGS. 5 and 6, with FIG. 5 representing a cross sectional view as in FIG. 3, and FIG. 6 representing a plan view of the top of the pivot region of the scissors. The intercast elements illustrated in FIGS. 5 and 6 are identical to those of FIG. 3, with the exception that a groove 45 is provided extending axially into the pin 30' from the head 31' thereof. The groove, as illustrated in FIG. 6, may be circular.

Figure 7:
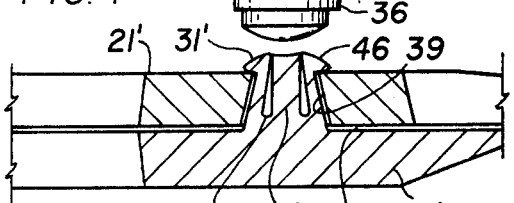
FIG. 7 is a cross sectional view illustrating the upsetting of the pivot joint of the arrangement of FIG. 5.

As illustrated in FIG. 7, when the intercast joint of FIGS. 5 and 6 is upset in a manner similar to that illustrated in FIG. 4, the circumferential regions 46 of the enlarged head 31' are forced into the groove 45. In other words, the downward forces exerted by the punch 36 tend to force the circumferential regions 46 of the head downward against the top of the member 21'. Since the groove 45 permits radial inward displacement of the circumferential regions of the head 31', the circumferential regions 46 effectively pivot about the edges of the aperture in the scissor member 21' to be deformed into the groove 45. The radial inward relief of the deformation provided by the groove 45 thus permits upsetting of the head 31' of the pin with considerably less force than that required in the arrangement of FIG. 3. As a consequence, the upsetting of the arrangement of FIGS. 5 and 6 is effected with less danger of undesirable bending of the scissor members 20' and 21'. This can be of importance, since the scissors are cast of a relatively soft material.

Figure 8:
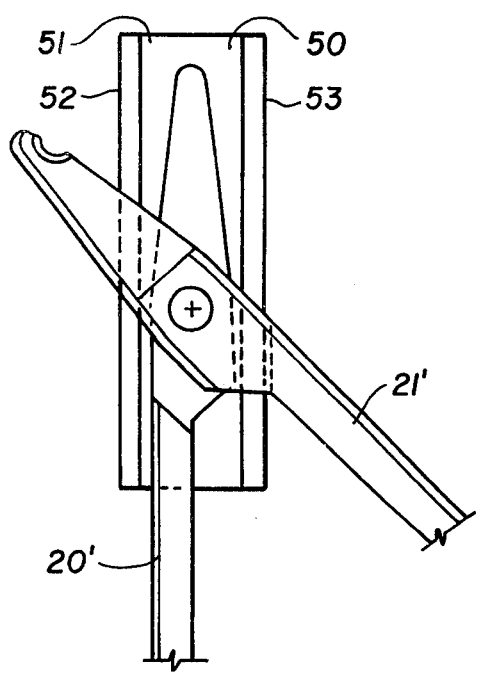
FIG. 8 is a top view of an upsetting tool, in accordance with the invention, and partially illustrating a pair of scissors mounted for upsetting of the pivot therein in accordance with the invention.
Figure 9:
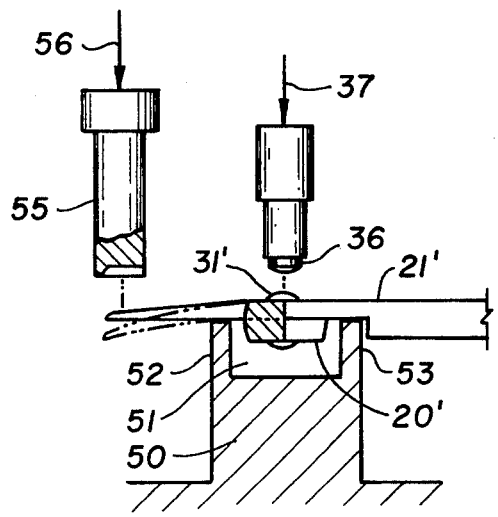
FIG. 9 is a cross sectional view of the tool and scissors of FIG. 8, and further illustrating upsetting and blade bending tools in combination therewith.

FIGS. 8 and 9 illustrate in greater detail a preferred technique for upsetting the pin of the scissors. As illustrated in these figures, an anvil 50 is provided having a channel 51 in its upper surface. The sides 52 and 53 of the channel are separated by a distance slightly greater than the width of a scissor blade in the region of the pivot joint. In order to upset the pin of an intercast scissors, the scissor blades are slightly opened as illustrated in FIG. 8, and the scissor member 20' having the pin cast integrally therewith is fitted in the channel 51 to extend generally longitudinally therein. The undersurfaces of the scissor member 21' thus rest on the side members 52 and 53 of the channel, this scissor member extending at an angle to the longitudinal direction of the anvil.

As illustrated in FIG. 9, with the scissor members thus supported, the punch 36 is forced downwardly onto the head 31' to effect the upsetting as illustrated in FIGS. 4 and 7. In other words, since the scissor member 21' is supported on the side members 52 and 53 from downward movement, the punching of the top of the pin 30' effects the distortion and upsetting of the head of the pin.

In oder to ensure a positive shearing action with the blades of the scissors in use, it may be necessary to slightly bow the blades 20' and 21' inwardly, i.e., toward each other. Otherwise, the blades may be sufficiently separated that reasonable shearing action is not obtained. This inward bowing of the blades may be obtained by casting the blades in the desired shape in the intercast process. Alternatively, however, one or both of the blades may be bent following the intercasting process. Thus, as illustrated in FIG. 9, with the blade 21' resting on the anvil, a suitable punching tool 55 may be forced downwardly, in the direction of the arrow 56, to bend the blade of the scissor member to a desired extent, for example as illustrated in dash lines in FIG. 9.

Figure 10:
FIG. 10 is a flow diagram for the method of forming an articulated cutting tool in accordance with the invention.

A method for forming the scissors in accordance with the invention is illustrated in the flow diagram of FIG. 10. In the first step of this process, the scissor elements are intercast, as above described. Then the pivot is upset, for example as illustrated in FIGS. 4 and 7 with a tool which may be of the form illustrated in FIGS. 8 and 9. If the blades of the scissors have not been cast with the desired bends therein, one or both of the blades may be bent at this time, as illustrated in FIG. 9.

The thus formed scissors are then deburred according to conventional practice, for example by tumbling, in order to remove undesirable projections and burrs formed therein during the casting process.

The thus formed scissors have the desired freedom of movement at the pivot pin, so that no undesirable binding or sticking of the joint is present. The scissors are also bent to the desired extent for effective shearing action at the blades. As discussed above, the scissors have been cast from a conventional casting material, which may be relatively soft so that the scissors do not form a practical cutting tool. Thus, the cutting edges would be dulled by only minor cutting operations.

In accordance with the invention, in order to overcome this problem, in the next step of the method illustrated in FIG. 10 the scissors are plated with a suitably hard material such as nickel or chromium. This plating may be effected by any conventional plating technique, such as barrel plating or rack plating. While it is only necessary, in theory, that the edges of the blades be so plated to provide a hard material in the shearing regions, if desired the entire scissors thus formed may be plated. For example, the plating of the entire scissors provides the advantage that the scissors may be more effectively cleaned and sterilized and the soft material of the interior of the scissors will not be as subject to abrasion and nicking.

Figures 11, 12:
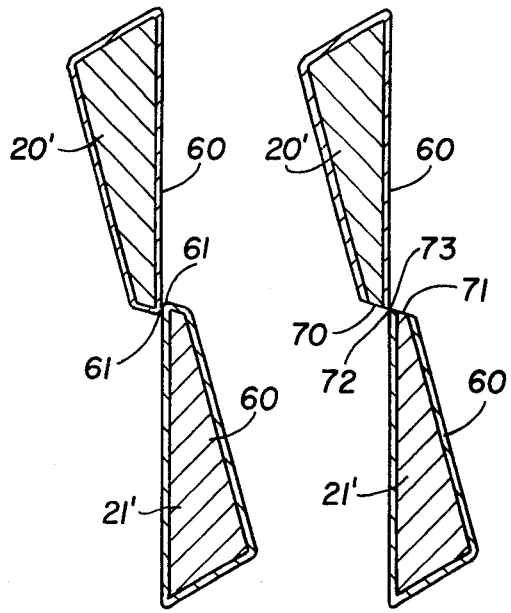
FIG. 11 is a cross sectional view of the scissors of FIG. 1, taken along the lines 11—11, and illustrating the core of casting material and the coating of hard material on the scissor blades.
FIG. 12 is a cross section of scissor blades corresponding to the view of FIG. 11, with the cutting edges ground off.

Although the blades of the scissors, following the plating thereof with a hard material, now have sufficient hardness that they would be capable of use for a reasonable period of time without dulling, the edges produced by conventional plating techniques are not sharp. For example, following the plating step, the edges of the blades of the scissors may be rounded with radiuses of, for example, 0.004 to 0.005 inches. The sectional view of the blades after the plating step is illustrated in FIG. 11, this figure being a cross sectional view of the scissors of FIG. 1 taken along the line 11—11, with a scissors formed in accordance with the invention. As illustrated in this figure, the blades 20' and 21' of casting material are coated with a layer 60 of hard material such as nickel or chromium. The shearing edges 61 of the blades are rounded, however, due to the plating as above described, and possibly also due to a certain extent to the difficulties of casting an extremely sharp edge. The scissors having a rounded edge, as illustrated in FIG. 11, are not suitable for precise cutting operations.

Further, in accordance with the invention, in order to provide a scissors with sharp cutting edges, the edges of the blades are ground as illustrated in FIG. 12. The angle of grinding of the edges is in accordance with the general procedure in the grinding of edges of scissors. It is to be noted, however, that the hard coating layer 60 may be entirely ground off in this grinding step, so that the base casting material is exposed at the surfaces 70 and 71. Thus, since the layer 60 may be plated on the scissors with a thickness of, for example, from 0.001 inch to 0.0015 inches, the necessary grinding of the cutting edges of the scissors to provide sharp edges may entirely remove the hard material at the faces 70 and 71. In accordance with the invention, however, this does not detract from the utility of the scissors. The grinding of the cutting edges of the scissors has now provided adequately sharp cutting edges for effective shearing action. Since the layer 60 on each of the blades extends to the faces 70 and 71, the hard material of layer 60 is present in the region where the shearing action of the scissors actually occurs, i.e., at the edges 72 and 73. Consequently, the scissors may be employed effectively as a cutting tool. While the scissors will of course not have the longer life of conventional scissors, they are quite suitable for precise cutting for limited periods of time for some applications.

The scissors formed as above described, in accordance with the invention, are very economical, since the intercasting process minimizes expenditures necessary in forming the basic structure. The desired free action of the scissors is readily and economically effected by the upsetting of the pivot pin as above discussed. A minimum amount of expensive material is employed in the formation of the hard layer 60, so that the material cost of the scissors is also very low. Consequently, the scissors formed in accordance with the invention as above described may be considered as throw-away items. This is an especial advantage in the medical field, since the scissors may be employed for a single operation and then disposed of or recycled. The resultant cost of such throw-away items, for example in hospitals, is considerably less than when conventional expensive and precise scissors are employed, and there is no necessity to keep track of the items since they are completely expendable. In addition to being inexpensive, the scissors are of sufficient quality and reliability for use in medical procedures.

Figure 13:
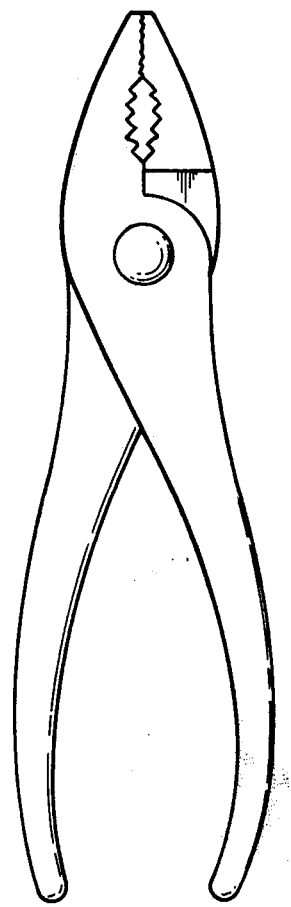
FIG. 13 is a plan view of a pair of pliers which may be formed in accordance with the invention, and have an articulated joint in accordance therewith.

While the invention has been particularly described with reference to scissors as cutting tools, it is obvious that the invention may also be employed for other cutting instruments, such as pliers, forceps, nippers and the like. In addition, certain aspects of the invention are adaptable for non-cutting articulated tools, such as pliers, as illustrated in FIG. 13, and the like. For example, in the formation of a pair of pliers as illustrated in FIG. 13, the elements of the pliers are intercast as illustrated in FIG. 3, with the tapered interconnecting pin. In order to provide adequately free action of the pliers, the pins of the pliers are upset, for example as illustrated in FIGS. 4 and 7. The pliers then may be deburred according to conventional practice. If desired, in order to provide a hard surface on the pliers to extend their useability to some extent, the pliers may be coated by conventional techniques with a harder material such as nickel or chromium. It is of course not necessary to grind any cutting edges in pliers of this type, so that the last above described step in the production of scissors and other cutting tools may be omitted. Consequently, the invention is adaptable to articulated cutting tools as well as to articulated holding tools incorporating a pair of jaws. The holding tools formed in accordance with the invention may also be expendable if desired.

It is also contemplated in accordance with the invention, that certain aspects thereof are advantageous with respect to non-articulated tools. For example, non-articulated shearing tools may have blades formed in accordance with the invention, by casting or otherwise forming a blade member of a soft material, then coating the soft material with a hard material by conventional techniques, and subsequently grinding off a cutting edge of the shearing tool to form a cutting edge with the layer of the hard material extending to the cutting edge. The soft material in this case may be a casting material such as zinc casting material, and the coating material may, as above described, be a material such as nickel or chromium.

While the invention has been disclosed and described with reference to a limited number of embodiments, it will be apparent that many modifications and variations thereof are possible, and it is intended in the following claims to cover each such variation and modification as falls within the true scope of the invention.

What is claimed is:

1. A method for forming a tool of the type having first and second articulated members of a die casting metal joined at a pivot joint by a pin extending from the first member through a correspondingly shaped aperture in the second member, with the pin having an enlarged head to hold said members together, said method comprising intercasting said first and second members with the pin on said first member being tapered with a larger diameter and toward said first member, and then upsetting said pin to provide a clearance space between said first and second members.

2. The method of claim 1 wherein said step of upsetting comprises striking the enlarged head of said pin while holding said second member in a fixed position, whereby the enlarged head of said pin is deformed to relatively space said first and second members.

3. The method of claim 1 for forming a shearing tool of the type having shearing blades on said first and second members positioned in relative shearing relationship, said method further comprising coating at least the blades of said members with a metal harder than the metal of which said members are cast.

4. A method for forming an articulated tool of the type having first and second articulated members of a die casting metal joined at a pivot joint by a pin extending from the first member through a correspondingly shaped aperture in the second member, with the pin having an enlarged head to hold said members together, said method comprising integrally casting said first member and a tapered pin with an enlarged head, the larger diameter end of said pin being toward said first member, then casting said second member in a mold with said tapered pin forming the mold for the pivot region of said second member, then deforming the enlarged end of said tapered pin to relatively separate said first and second members.

5. The method of claim 4 wherein said step of deforming comprises punching said enlarged end of said pin while holding said second member in a fixed position.

6. The method of claim 4 further comprising coating said members with a metal harder than the metal from which they were cast subsequent the casting thereof.

7. The method of claim 6 for forming a shearing tool of the type in which said first and second members have blade ends positioned in relative shearing relationship with first relatively parallel faces and second faces joining the respective first faces at an angle to form shearing edges, said method further comprising grinding said second faces after said step of coating, to sharpen said shearing edges.

8. The method of claim 7 wherein said step of grinding comprises grinding said second faces through said coating of harder metal to expose the metal of which said members are cast at said second faces, whereby said coating of harder metal on said first faces extends to said shearing faces.

9. The method of claim 1 further comprising forming a groove extending from said enlarged head into said pin before said step of upsetting, whereby said enlarged head is deformed into said groove upon upsetting said pin.

* * * * *